United States Patent
Zhang et al.

(10) Patent No.: US 6,762,813 B1
(45) Date of Patent: Jul. 13, 2004

(54) ELECTRO-OPTICAL DEVICE AND METHOD OF MANUFACTURING THE SAME

(75) Inventors: Hongyong Zhang, Kanagawa (JP); Yoshiharu Hirakata, Kanagawa (JP); Kenji Otsuka, Kanagawa (JP); Shunpei Yamazaki, Tokyo (JP); Hideaki Kuwabara, Kanagawa (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 0 days.

(21) Appl. No.: 08/975,402

(22) Filed: Nov. 20, 1997

(30) Foreign Application Priority Data

Nov. 22, 1996 (JP) .............................. 8-327980

(51) Int. Cl.⁷ ...................... G02F 1/1368; G02F 1/1343
(52) U.S. Cl. ............................ 349/141; 349/43; 438/30
(58) Field of Search ............................ 349/42, 43, 141, 349/187, 122, 143; 257/59, 72; 345/92; 438/30

(56) References Cited

U.S. PATENT DOCUMENTS

| 5,598,285 A | * | 1/1997 | Kondo et al. ............... 349/141 |
|---|---|---|---|
| 5,786,876 A | * | 7/1998 | Ota et al. .................... 349/141 |
| 5,870,160 A | * | 2/1999 | Yanagawa et al. .......... 349/141 |
| 5,899,547 A |   | 5/1999 | Yamazaki et al. |
| 5,977,562 A | * | 11/1999 | Hirakata et al. ............ 349/141 |
| 6,055,028 A |   | 4/2000 | Nishi et al. |
| 6,137,560 A | * | 10/2000 | Utsumi et al. .............. 349/181 |

FOREIGN PATENT DOCUMENTS

| JP | 27483/1978 | 3/1978 |
|---|---|---|
| JP | 61-141174 | 6/1986 |
| JP | 1-156725 | 6/1989 |
| JP | 7-36058 | * 2/1995 |

* cited by examiner

Primary Examiner—Toan Ton
Assistant Examiner—Tai Duong
(74) Attorney, Agent, or Firm—Fish & Richardson P.C.

(57) ABSTRACT

In a liquid crystal display device, gate lines and common lines are first concurrently formed, and after an interlayer film is formed, a pixel electrode, common electrodes, and source lines are formed at the same time. By this, a electrode pattern can be made simple and manufacturing steps are simplified. Further, wiring lines and electrode disposed in the layer closest to a liquid crystal layer are made the pixel electrode, common electrodes and source lines, and the shapes thereof are made simple.

21 Claims, 16 Drawing Sheets

ELECTRO-OPTICAL DEVICE AND METHOD OF MANUFACTURING THE SAME

BACKGROUND OF THE INVENTION

1. Field of the Invention

The present invention relates to a semiconductor device having an insulated gate structure using a crystalline silicon film disposed on an insulating substrate of glass, quartz or the like, for example, a thin film transistor (TFT), a thin film diode (TFD), and a thin film integrated circuit using the thin film elements, especially a thin film integrated circuit for a passive matrix type liquid crystal display device and a thin film integrated circuit for an active matrix type liquid crystal display device, and also relates to a method of manufacturing the same.

2. Description of the Related Art

In recent years, there has been vigorously carried out studies on an active matrix type liquid crystal display device in which thin film transistors are formed in a matrix form on an insulating substrate of glass, quartz or the like, and the TFTs are used as switching elements.

Also, an attention has been paid to an active matrix type liquid crystal display device in which an active matrix circuit (also called a pixel circuit or pixel matrix circuit) and a peripheral drive circuit (also called a driver circuit) are integrated on the same insulating substrate. This structure is called a peripheral drive circuit integration type.

A conventional active matrix type liquid crystal display device uses transparent electrodes in which electrodes for driving a liquid crystal layer are formed on two substrates faced to each other. A liquid crystal is sealed between the two substrates, and the direction of an electric field applied to the liquid crystal is made substantially perpendicular to the surface of the substrate. The liquid crystal device is realized by changing the intensity of the electric field so that the direction of orientation of liquid crystal molecules generally having a rod shape are changed so as to be parallel to the substrate or perpendicular to the substrate. Generally, in this case, since light is made to be modulated by using an optical anisotropy as one of features of the liquid crystal material, a polarizing plate is disposed in the device so that incident light is made linearly polarized light.

However, in the liquid crystal electro-optical device having such an operation method, there is observed such a phenomenon that although the state of display is normal when the display surface is seen from the direction perpendicular thereto, the display is dark and becomes blurred when the display surface is seen from the direction at an angle thereto, and further, color is changed when the display is colored.

In order to solve such a problem, there is a method (IPS mode) in which the direction of an electric field applied to a liquid crystal layer is made parallel to the surface of a substrate.

In such an electro-optical device, since switching is carried out while a longitudinal axis of a liquid crystal molecule is kept parallel to the substrates, the change of optical characteristics of the liquid crystal due to an angle of visual field is small.

Thus, leak of light, lowering of contrast and the like due to the angle of visual field are smaller than a conventional TN or STN system.

There is known a structure of an electrode of this IPS mode as shown in FIG. 17 in which a comb-shaped electrode is formed on one substrate.

However, there is a problem that when the comb-shaped electrode is used, a wiring pattern is made minute and complicated in a pixel element, so that productivity becomes inferior.

Also, since the shape of the electrode is complicated, an electric field applied to a liquid crystal layer becomes complicated.

Further, light is shaded by the comb-shaped electrode, so that an effective area (opening rate) through which light can passes, becomes extremely low. Thus, only a dark display can be realized, and it can not be put into practical use.

SUMMARY OF THE INVENTION

The present invention has been made to overcome the above described problems, and an object of the invention is therefore to provide a liquid crystal display device of peripheral drive circuit integration type which has high contrast even if a transparent electrode is not provided, can be manufactured through simple steps, can be mass-produced, has a large opening rate, and is bright. Another object thereof is to provide a method of manufacturing the same.

In order to solve the above problems, according to the present invention, the following means are adopted.

According to a first aspect of the present invention, as shown in FIG. 1, a liquid crystal display device is characterized by comprising: a pair of substrates, at least one thereof being transparent; a liquid crystal layer placed between the pair of substrates; a plurality of pixels arranged in a matrix form on one thereof; a pixel electrode 108 and common electrodes 110 and 111 existing in the same layer; and common lines 103 and 104 existing in a layer different from the common electrodes through an insulating layer and being connected to the common electrodes through contact holes, an electric field being applied between the pixel electrode and the common electrodes substantially parallel to the surface of the substrate so as to control the state of orientation of liquid crystal molecules so that light can be modulated.

In the above structure, the liquid crystal display device is an active matrix type liquid crystal display device in which a thin film transistor is disposed for each of the pixels, and the thin film transistor includes a pixel electrode 108, gate lines 102 and 105 connected to a scanning line, and source lines 106 and 107 connected to a signal line.

In the above structure, the liquid crystal display device is a passive matrix type liquid crystal display device driven in a passive manner.

In the liquid crystal display device, the common electrodes 110 and 111, and the pixel electrode 108 are parallel to each other, exist in the same layer as shown in FIG. 2, and are made of the same material and by the same steps.

In the liquid crystal display device, the common electrodes and the pixel electrode are made of aluminum, metal mainly containing aluminum, silicon, or a laminated layer of titanium and aluminum.

In the liquid crystal display device, the common lines 103 and 104 and the gate lines 102 and 105 exist in the same layer as shown in FIG. 2, and are made of the same material and by the same steps.

According to a second aspect of the present invention, as shown in FIG. 3, a liquid crystal display device is characterized by comprising: a pair of substrates, at least one thereof being transparent; a liquid crystal layer placed between the pair of substrates; a plurality of pixels arranged in a matrix form on one thereof; a pixel electrode 108 and common electrodes 110 and 111 existing in the same layer; a common line existing in a layer different from the common electrodes through an insulating layer and being connected to the common electrodes through contact holes; and a flattened film 230 disposed on the common electrodes and the pixel electrode, an electric field being applied between the pixel electrode and the common electrodes substantially parallel to the surface of the substrate so as to control the state of orientation of liquid crystal molecules, so that light can be modulated.

In the liquid crystal display device, the flattened film 230 disposed on the common electrodes and the pixel electrode is formed of an organic material film made of polyimide or the like, an inorganic material film made of silicon nitride, silicon oxide or the like, or a laminated film thereof.

Also, as shown in FIG. 1, a liquid crystal display device is characterized by comprising: a pair of substrates, at least one thereof being transparent; a liquid crystal layer placed between the pair of substrates; a plurality of pixels arranged in a matrix form on one thereof; and a pixel electrode 108 placed between a pair of common electrodes 110 and 111 in one pixel, an electric field being applied between the pixel electrode and the common electrodes substantially parallel to the surface of the substrate so as to control the state of orientation of liquid crystal molecules, so that light can be modulated.

According to a third aspect of the present invention, as shown in FIGS. 4 to 8, a method of manufacturing a liquid crystal display device is characterized by comprising the steps of: forming a crystalline semiconductor layer 101 on a substrate having an insulating surface 201; forming a gate insulating film 205 on the crystalline semiconductor layer; forming a first conductive film 210 on the gate insulating film; shaping the first conductive film into gate lines 102 and 105, and common lines 103 and 104; doping the crystalline semiconductor layer; forming a first interlayer film 206 on the entire surface; forming contact holes; forming a second conductive film on the first interlayer film; and shaping the second conductive film into a pixel electrode 108, common electrodes 110 and 111, and source lines 106 and 107.

The crystalline semiconductor layer in the present invention is a silicon film having at least crystallinity, such as a single crystal silicon film, a polycrystalline silicon film containing both amorphous silicon and crystal silicon, and a polycrystalline silicon film mainly composed of amorphous silicon and containing a slight amount of crystalline silicon.

In order to obtain a structure as shown in FIG. 3, a method of manufacturing a liquid crystal display device is characterized by comprising the steps of: forming a crystalline semiconductor layer 101 on a substrate having an insulating surface 201; forming a gate insulating film 205 on the crystalline semiconductor layer; forming a first conductive film 210 on the gate insulating film; shaping the first conductive film into a gate line 105, and common lines 103 and 104; doping the crystalline semiconductor layer; forming a first interlayer film 206 on the entire surface; forming contact holes; forming a second conductive film on the first interlayer film; shaping the second conductive film into a pixel electrode 108, common electrodes 110 and 111, and source lines 106 and 107; and forming a flattened film 230 on the pixel electrode, the common electrodes, the source lines, and the entire surface of the substrate.

A method of manufacturing a liquid crystal display device is characterized by comprising the steps of: forming a crystalline semiconductor layer on a substrate having an insulating surface; forming a gate insulating film on the crystalline semiconductor layer; forming a first conductive film on the gate insulating film; shaping the first conductive film into a gate line and a common line; doping the crystalline semiconductor layer; forming a first interlayer film on the entire surface; forming contact holes; forming a second conductive film on the first interlayer film; and shaping the second conductive film into a pixel electrode, a common electrode, and a source line, wherein five or less masks are used in the manufacturing steps.

In the method of manufacturing a liquid crystal display device, the flattened film 230 on the common electrode is formed of an organic film of polyimide or the like, an inorganic material film of silicon nitride, or a laminated film thereof.

A method of manufacturing a liquid crystal display device is characterized by comprising the steps of: forming a crystalline semiconductor layer on a substrate having an insulating surface; forming a gate insulating film on the crystalline semiconductor layer; forming a first conductive film on the gate insulating film; shaping the first conductive film into a gate line and a common line; oxidizing the first conductive film; carrying out first impurity doping to the crystalline semiconductor layer; removing the oxidized conductive film; carrying out second impurity doping with concentration lower than the first impurity doping after the step of removing the oxidized conductive film; forming a first interlayer film on the entire surface; forming a contact hole; forming a second conductive film on the first interlayer film; and shaping the second conductive film into a pixel electrode, a common electrode, and a source line, wherein five or less masks are used in the manufacturing steps.

The above method further comprises a step of forming a flattened film on the entire surface of the substrate after the step of shaping the second conductive film into the pixel electrode, the common electrode and the source line, wherein five or less masks are used in all the manufacturing steps.

According to a fourth aspect of the present invention, as shown in FIG. 9, a liquid crystal display device is characterized in that a wiring connection terminal 900 for an external device is made of a laminated layer which is formed by lamination of at least two wiring lines.

As shown in FIG. 10B, a liquid crystal display device is characterized in that a wiring connection terminal 900 for an external device is made of a laminated layer of at least two wiring lines, which is disposed on a silicon film 101 formed on an insulating substrate.

In the liquid crystal display device, the laminated layer of wiring lines is formed of the same material and by the same step.

In the liquid crystal display device, the wiring connection terminal 900 is made of aluminum, metal mainly containing aluminum, conductive inorganic compound, silicon, or a laminated layer of titanium and aluminum.

As shown in FIG. 10B, a method of manufacturing a liquid crystal display device is characterized by comprising the steps of: forming a first conductive film 210 on a substrate 201 having an insulating surface; shaping the first conductive film into a first wiring terminal 211; forming a second conductive film 220 on the first conductive film; shaping the second conductive film into a second wiring terminal 221; forming an interlayer insulating film 230 on the entire surface of the substrate; and shaving off the interlayer insulating film on the surface of the substrate to expose the upper surface of the second wiring terminal to form a wiring connection terminal 900 for an external device.

A method of manufacturing a liquid crystal display device is characterized by comprising the steps of: forming a semiconductor layer 101 on a substrate 201 having an insulating surface; forming a first conductive film 210 on the semiconductor layer; shaping the first conductive film into a first wiring terminal 211; forming a second conductive film on the first conductive film; shaping the second conductive film into a second wiring terminal 221; forming an interlayer insulating film 230 on the entire surface of the substrate; and shaving off the interlayer insulating film on the surface of the substrate to expose the upper surface of the second wiring terminal to form a wiring connection terminal 900 for an external device.

According to a fifth aspect of the present invention, as shown in FIG. 12, a liquid crystal display device is characterized by comprising: a pair of substrates, at least one being transparent; a liquid crystal layer placed between the pair of substrates; first wiring lines and second wiring lines existing in layers different from each other through an insulating layer, the second wiring lines shading a region between the first wiring lines adjacent in parallel to each other, and the first wiring lines shading a region between the second wiring lines adjacent in parallel to each other; and pixel display regions surrounded by the first wiring lines and the second wiring lines, the pixel display regions being able to modulate light.

A liquid crystal display device is characterized by comprising: a pair of substrates, at least one being transparent; a liquid crystal layer placed between the pair of substrates; a pixel electrode 1208 placed between a pair of common electrodes 1210 and 1211 in one pixel; a common line 1203 shading regions between the source lines 1206 and 1207 and the adjacent common electrodes; and a pixel electrode 1208 shading a region between a gate line 1205 and the adjacent common line 1203.

In the liquid crystal display device, holding capacitance is formed between both the common line 1203 and gate line 1205 of the first wiring line and the pixel electrode of the second wiring line.

As shown in FIG. 16, a liquid crystal display device is characterized in that an opposite substrate includes a plurality of black matrices 1600 smaller than a common electrode 1210 so that they sufficiently cover gaps occurring between wiring lines when the pair of substrates are laminated.

DETAILED DESCRIPTION OF THE INVENTION

First, a method of manufacturing a liquid crystal display device according to the present invention will be described with reference to FIGS. 4 to 8.

Figure 4A:
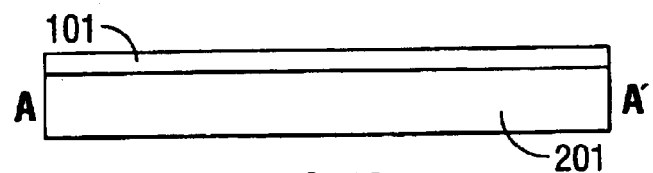
FIGS. 4A to 4C are sectional views showing manufacturing steps of the first embodiment of the present invention.
Figure 4B:
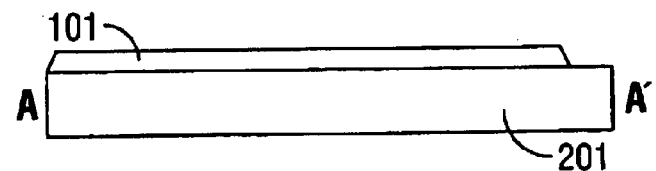
Figure 4C:
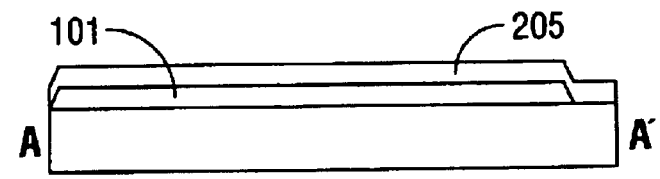

An amorphous silicon film 101 is formed on a substrate having an insulating surface (FIG. 4A), and is patterned (1) into an island with a desired size by using photolithography (FIG. 4B). A gate insulating film 205 is formed thereon (FIG. 4C).

Figure 5:
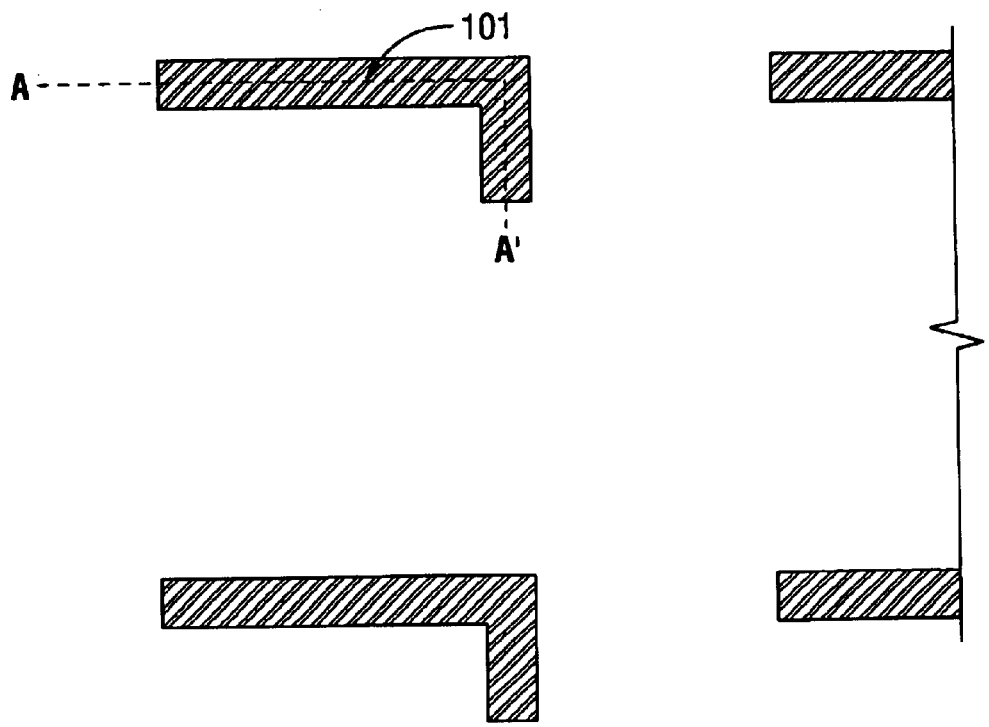
FIG. 5 is a top view showing the state in the manufacturing step of FIG. 4C.

FIG. 5 is a top view showing this state.

Figure 6A:
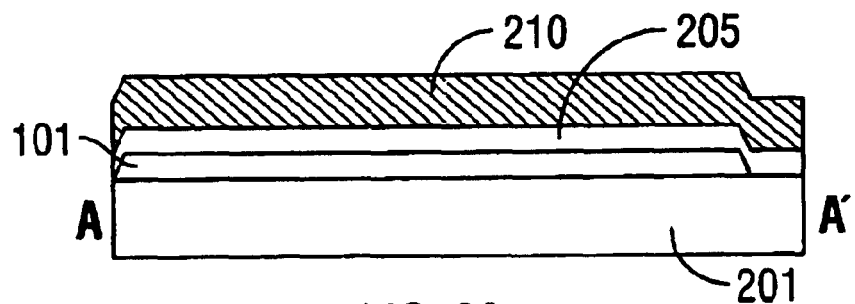
FIGS. 6A to 6C are sectional views of manufacturing steps of the first embodiment of the present invention.

A first conductive film 210 is formed on the gate insulating film (FIG. 6A).

As a material of the first conductive film, there may be used Cr, Al, Ta or Ti. Alternatively, a multilayer film constituted by those materials may be formed.

Figure 6B:
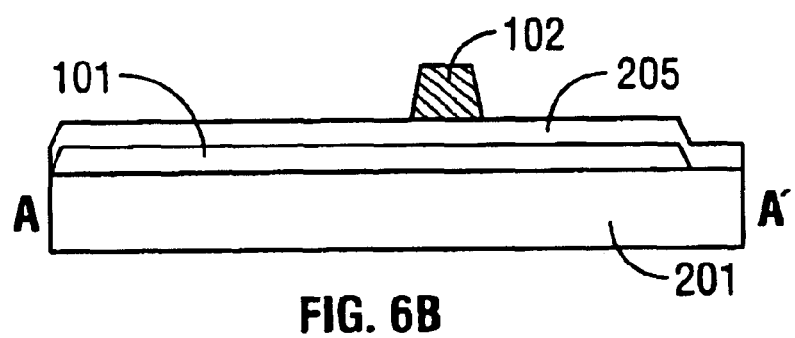

Next, by using the photolithography, patterning (2) is carried out to form a scanning line, gate lines 102 and 105 connected to the scanning line, and common lines 103 and 104 (FIG. 6B).

Figure 7:
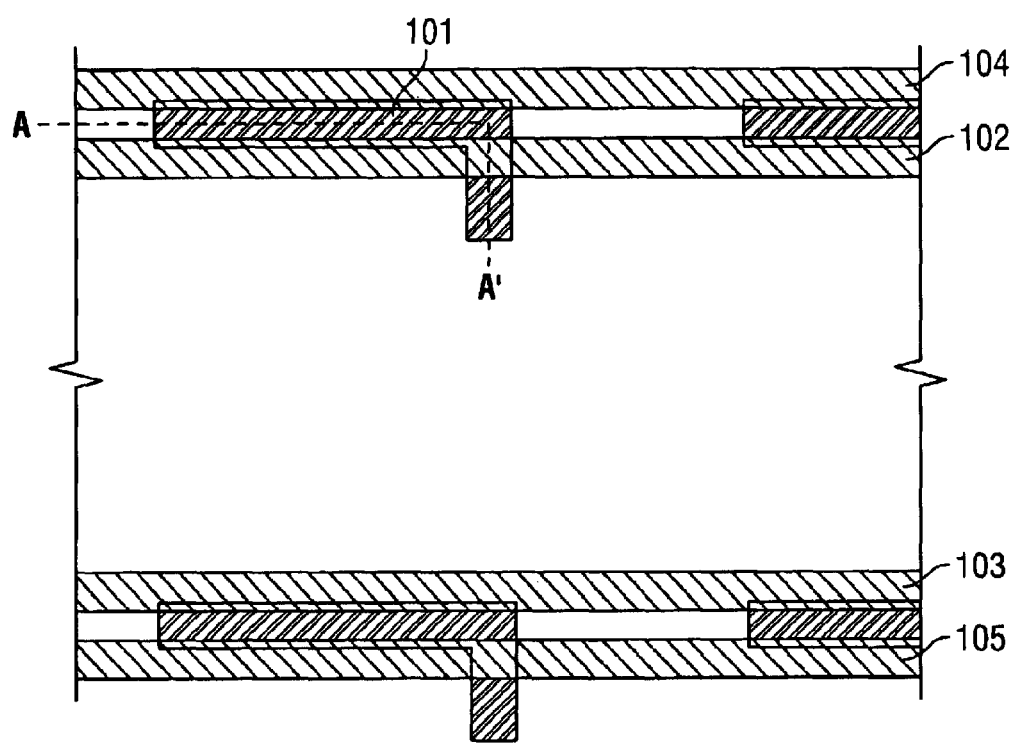
FIG. 7 is a top view showing the state in the manufacturing step of FIG. 6B.

FIG. 7 is a top view showing this state.

Then the gate insulating film 205 is etched by using the gate electrode as a mask.

Thereafter, P ions are implanted into a semiconductor layer by a well known ion doping method.

Figure 6C:
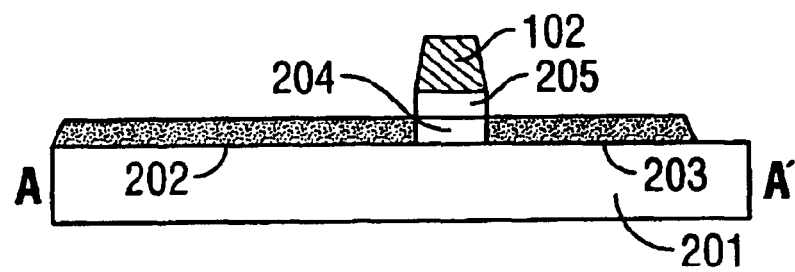

Subsequently, an N-channel TFT is covered (3) with a resist mask, and B ions are implanted. Then laser annealing is carried out (FIG. 6C).

At this time, an LDD structure may be formed by a well-known ion doping method. This can make the characteristics of a transistor more stable.

Figure 8A:
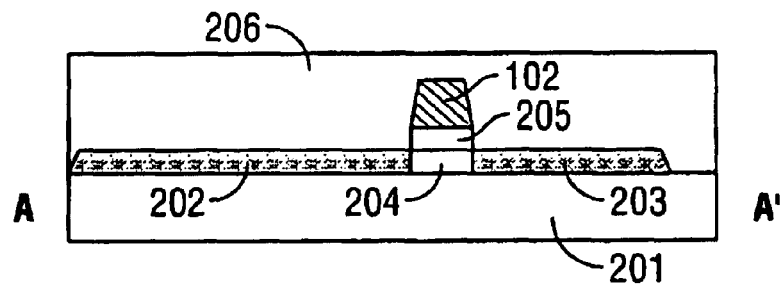
FIGS. 8A to 8C are sectional views of manufacturing steps of the first embodiment.
Figure 8B:
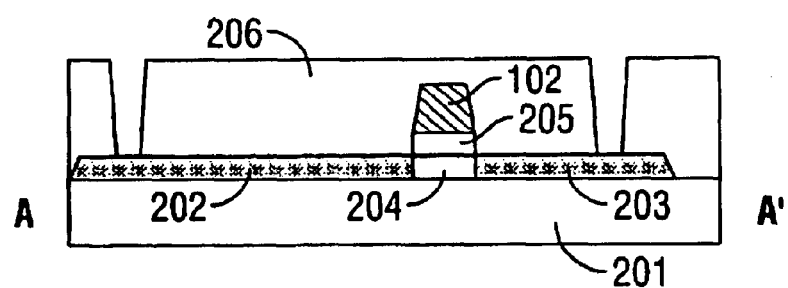
Figure 8C:
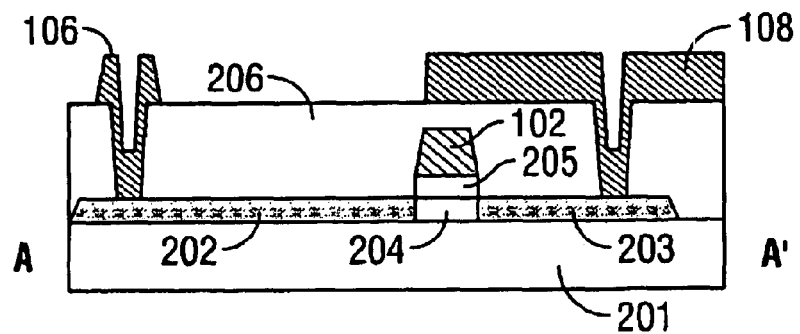
Figure 17:
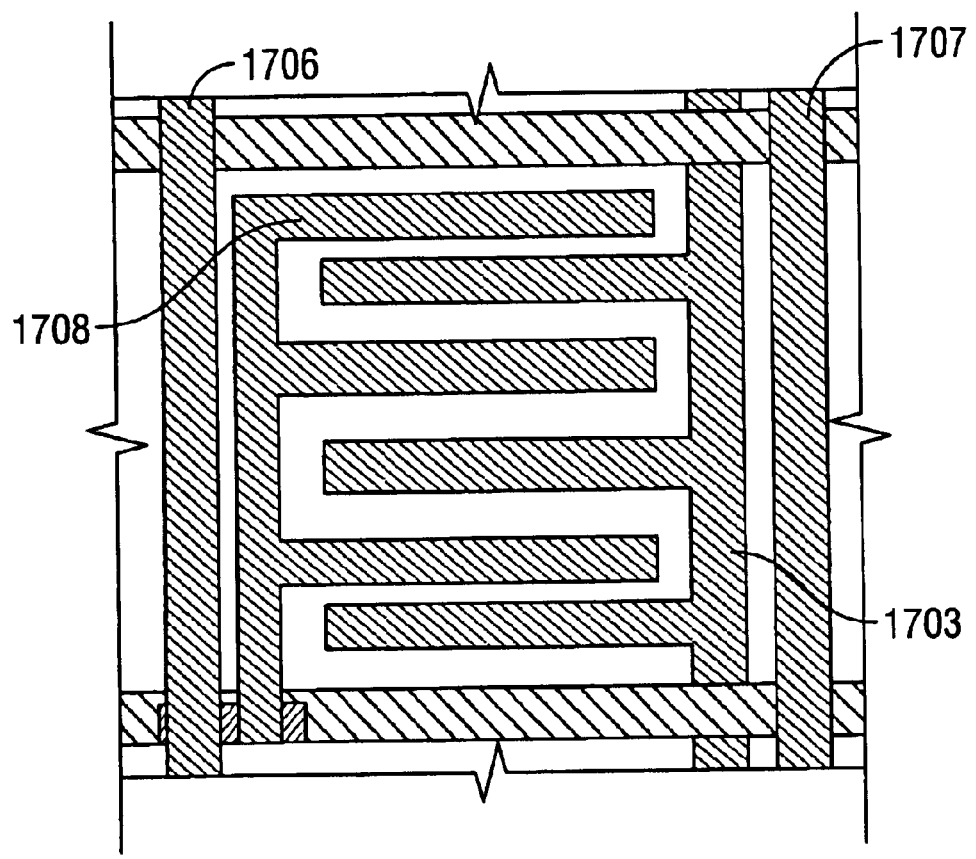
FIG. 17 is a top view showing a pixel portion constituted by a conventional comb-shaped electrode.

Next, a first interlayer insulating film 206 is formed (FIG. 8G). This interlayer insulating film separates the common line and a common electrode from each other, which are connected through only a contact hole. In this way, the disturbance of an electric field generated by a comb-shaped electrode is prevented. In the conventional comb-shaped electrode 1703, 1708 as shown in FIG. 17, when an electric field is applied to a liquid crystal layer, there occurs disturbance of an electric field due to an unnecessary wiring line (for example, a common line 1706, 1707 or source linen at a portion other than a tooth of a comb) irrelevant directly to the operation.

Further, if a flattened film of polyimide or the like is formed thereon, the distance between the end of a pixel electrode formed in a subsequent step and the substrate can be made equal to that between the end of the common electrode and the substrate.

The interlayer insulating film may be a film of organic material such as polyimide, a film of inorganic material of silicon nitride, or a laminated film thereof.

Thereafter, by using photolithography, patterning is carried out (4) (FIG. 8H), and a second conductive film is formed thereon by a well-known sputtering method.

Again, by using the photolithography, patterning is carried out (5) to form a pixel electrode 108, a common electrode, and a source line 106 so that the state shown in FIG. 8I is obtained.

Figure 1:
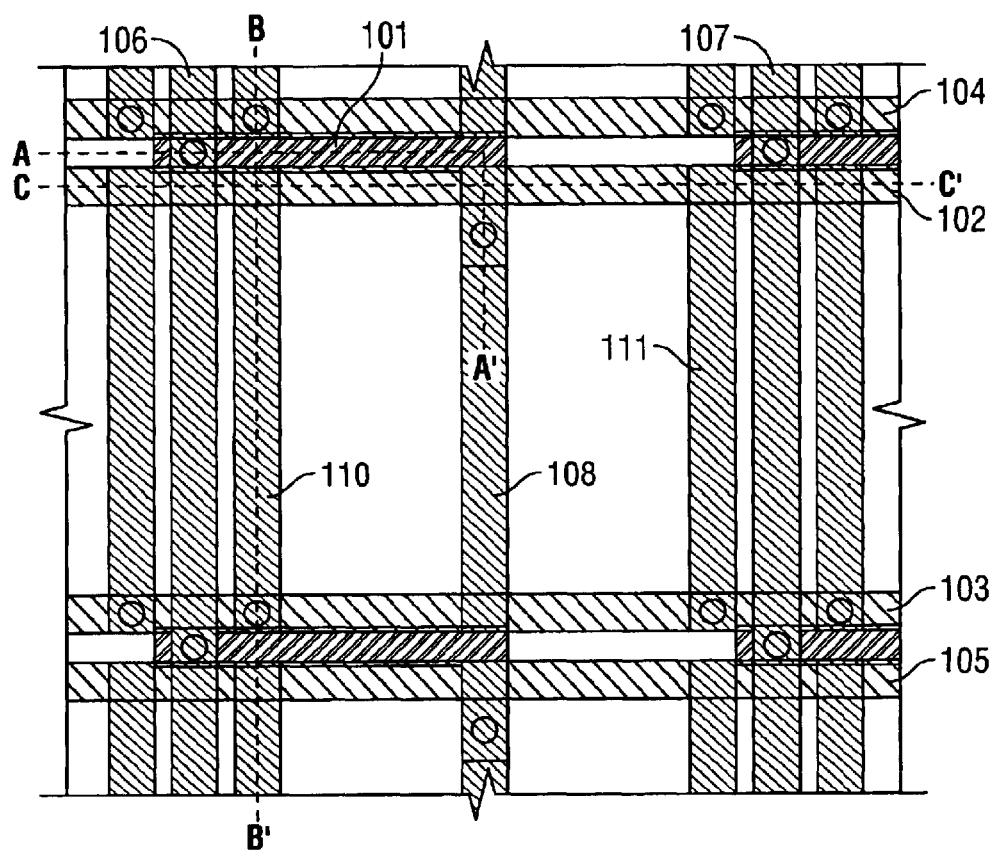
FIG. 1 is a top view showing the structure of a pixel portion in a liquid crystal display device of a first embodiment of the present invention.
Figure 2A:
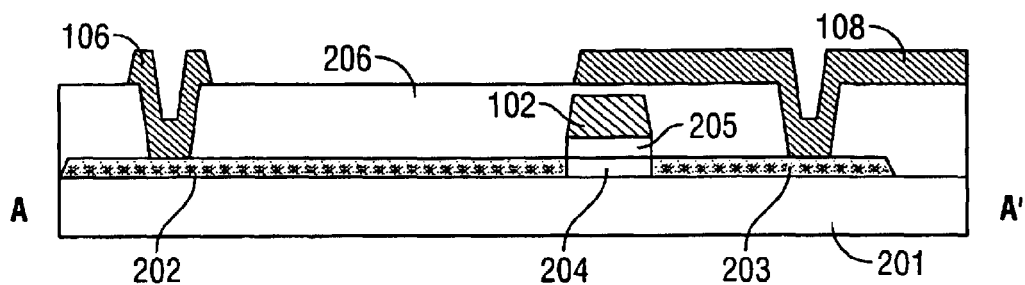
FIGS. 2A to 2C are sectional views showing the pixel portion of the first embodiment of the present invention taken along line A–A', line B–B' and C–C' in FIG. 1.
Figure 2B:
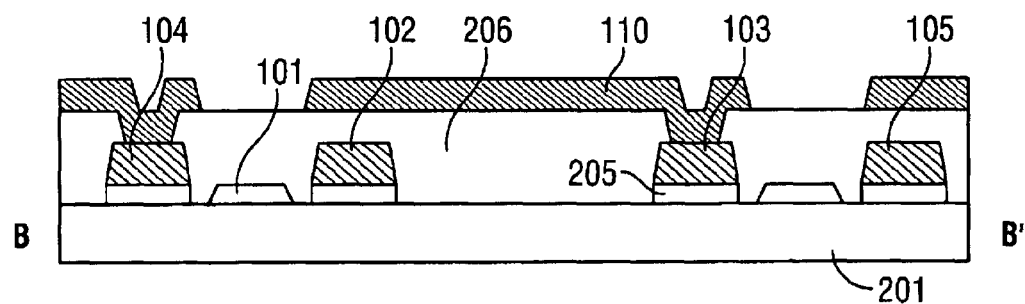
Figure 2C:
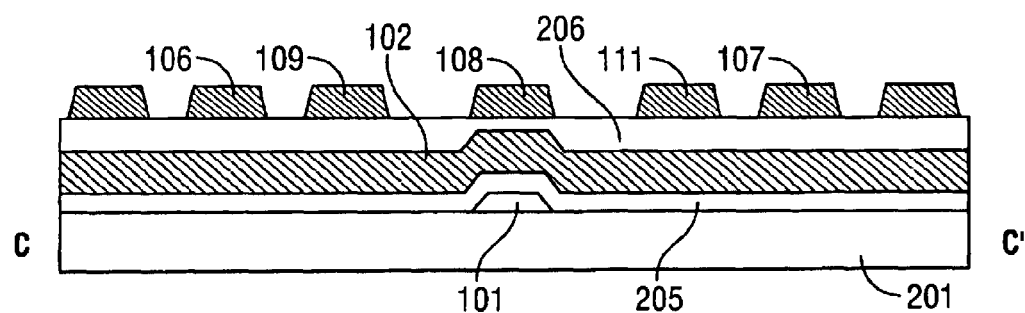

FIG. 1 is a top view showing this state.

In FIG. 1, invisible portions by overlap of wiring lines are intentionally shown, and portions formed of the same material and same step are shown by the same slanted line pattern.

In this way, a CMOS structure can be made through five masks in steps (1), (2), (3), (4), and (5).

As described above, the interlayer insulating film or the laminated film of the flattened film is formed, and the distance between the end of the common electrode and the substrate is made substantially equal to that between the end of the pixel electrode and the substrate, so that the pixel electrode is formed just beside the common electrode with the insulating film intervening therebetween.

This makes possible to apply an electric field to the liquid crystal layer just laterally, so that display characteristics are improved.

Figure 9A:
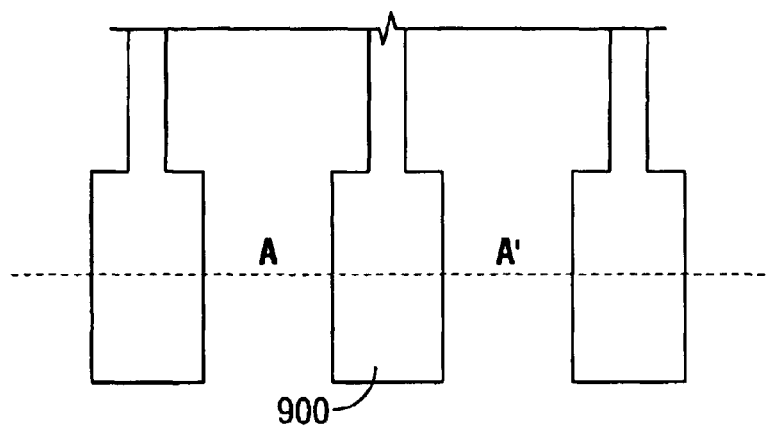
FIG. 9A is a top view showing a wiring connection terminal of the present invention and FIG. 9B is a sectional view taken along line A–A' in FIG. 9A.

At the same time as the above manufacturing steps, wiring connection terminals 900 for an external device shown in FIG. 9A are formed through five masks in steps (1), (2), (3), (4) and (5).

Figure 9B:
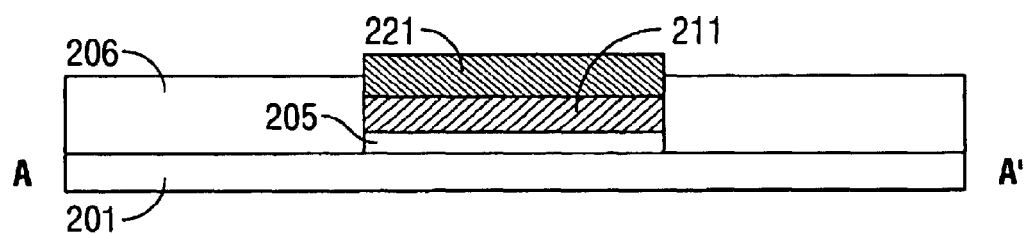

FIG. 9B is a sectional view showing this wiring connection terminals.

Conventionally, in order to form the wiring connection terminal, a step of using a mask must be added.

First, similarly to the above manufacturing steps, a crystalline semiconductor thin film is formed on the substrate having an insulating surface, and is patterned (1) into an island having a shape of a wiring connection terminal by using photolithography.

However, since this step is merely for adjusting the height, it may be omitted in forming the wiring connection terminal.

Next, a gate insulating film 205 is formed thereon. A first conductive film 210 is formed on the gate insulating film.

The first conductive film may be made of Cr, Al, Ta or Ti. The first conductive film may be a multilayer film made of those materials.

Next, by using the photolithography, patterning is carried out (2) to form a first wiring terminal 211.

Then the gate insulating film 205 is etched and a first interlayer insulating film 206 is formed.

Thereafter, by using the photolithography, patterning is carried out (4) to remove the first interlayer insulating film on the first wiring terminal 211, and a second conductive film 220 is formed thereon by a well-known sputtering method.

Again, by using the photolithography, patterning is carried out (5) to form a second wiring terminal 221.

Figure 10A:
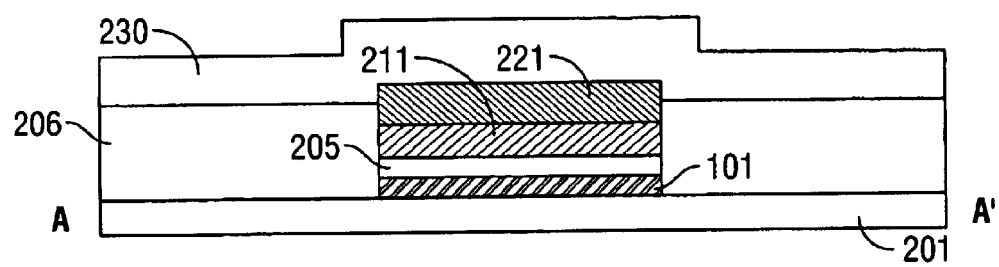
FIGS. 10A and 10B are sectional views showing manufacturing steps of a wiring connection terminal of the present invention.
Figure 10B:
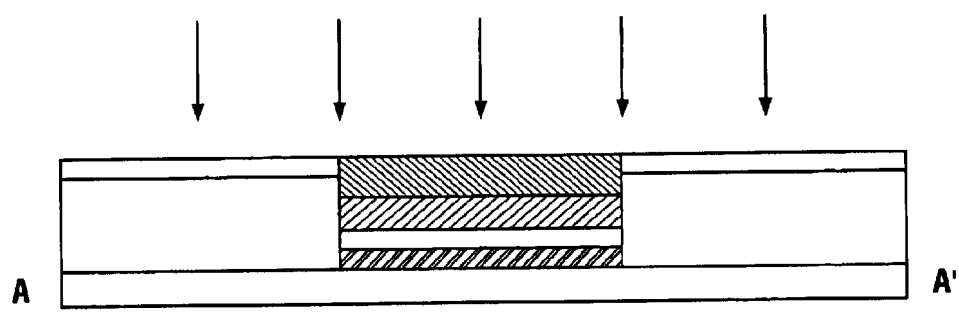

Thereafter, in the case where a second interlayer insulating film 230 is formed, the surface of the second wiring terminal 221 is covered (FIG. 10A). Then, $O_2$-ashing is carried out to shave off the surface to expose the surface of the second wiring terminal and the surface of the second wiring line (FIG. 10B). In this way, the wiring connection terminal 900 for an external device can also be fabricated by four to five masks in steps ((1)), (2), (3), (4), and (5).

By the above manufacturing steps, it becomes possible to manufacture a liquid crystal display device of peripheral driver circuit integration type provided with a wiring connection terminal for an external device through five or less masks.

Also, the structure of an electrode may be as follows.

Figure 11:
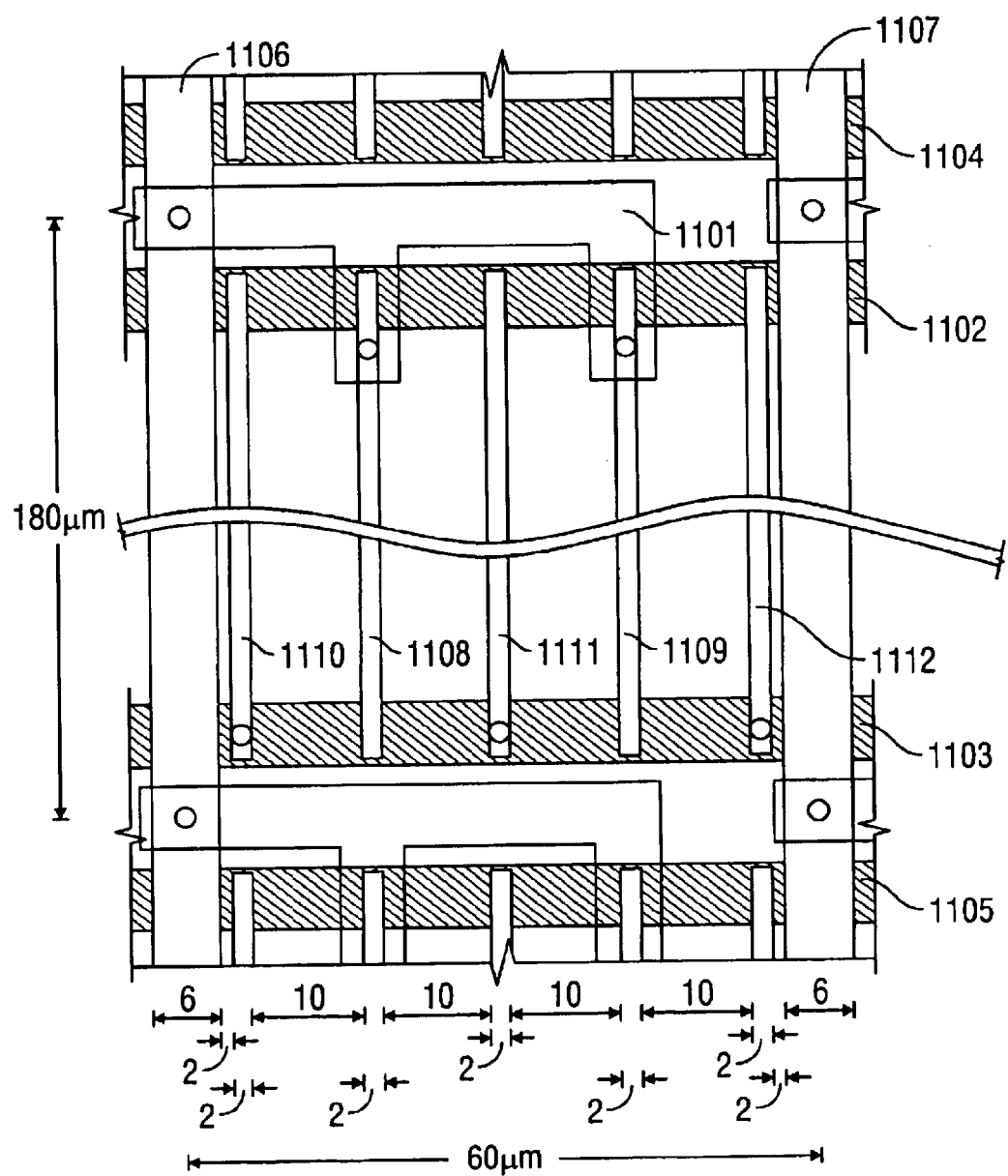
FIG. 11 is a top view showing the structure of a pixel portion in the liquid crystal display device of a second embodiment of the present invention.

For example, as shown in FIG. 11, the arrangement of pixel electrodes and common electrodes is such that plural pairs of common electrodes are provided in one pixel, and a pixel electrode is disposed between one pair of common electrodes.

This further improves an opening rate.

Figure 12:
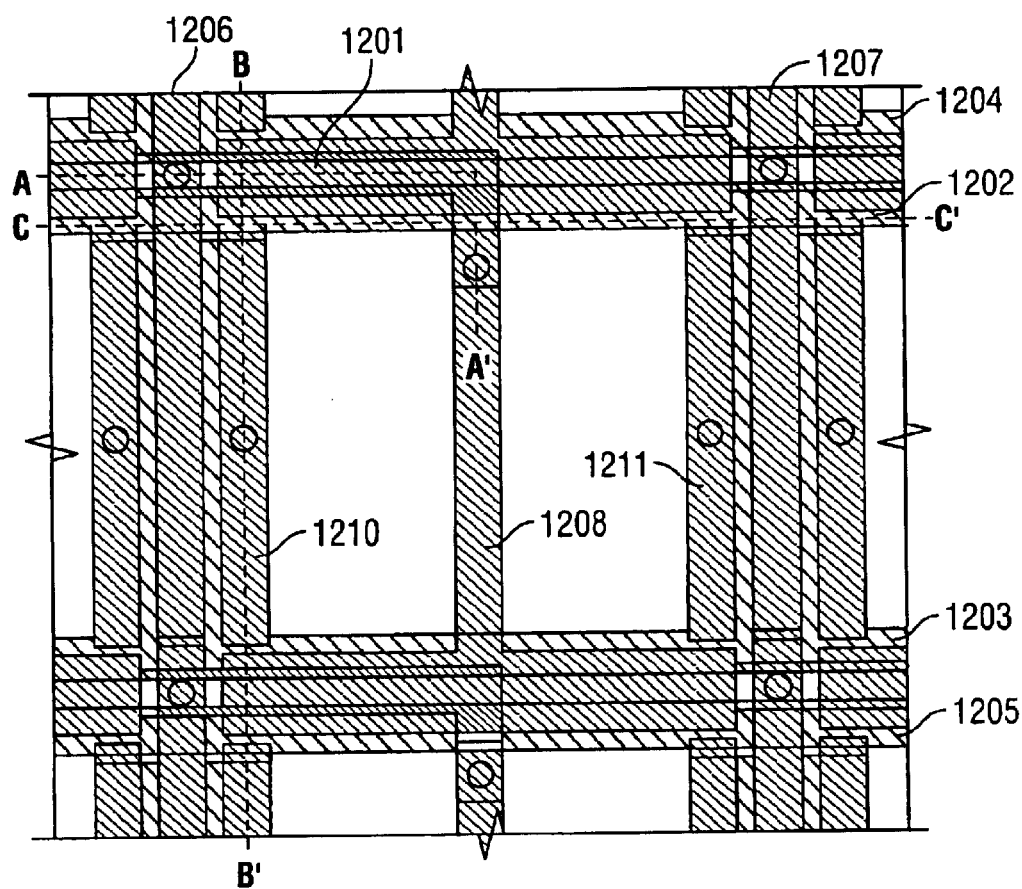
FIG. 12 is a top view showing the structure of a pixel portion in the liquid crystal display device of a third embodiment of the present invention.

Further, a pixel electrode 1208 may be shaped as shown in FIG. 12, so that holding capacitance is formed between the pixel electrode and both common line 1203 and gate line 1205.

Figure 14:
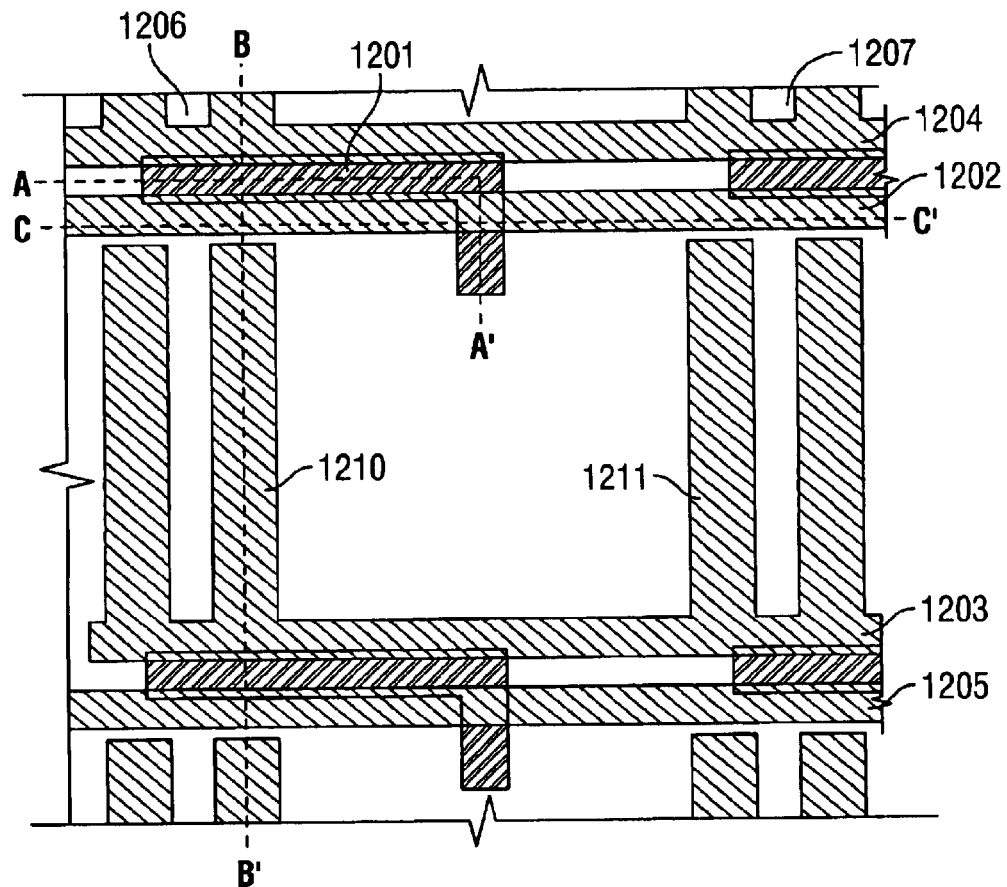
FIG. 14 is a top view showing manufacturing steps of the third embodiment of the present invention.

Further, the common line 1203 is designed as shown in FIG. 14, further holding capacitance is formed.

Figure 15:
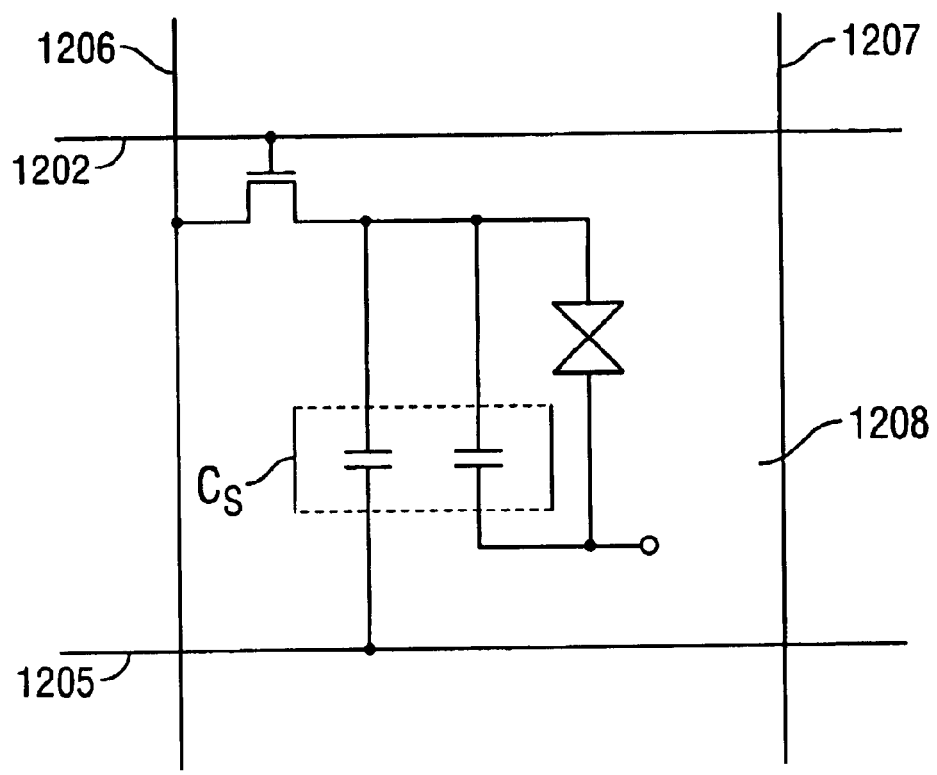
FIG. 15 is an equivalent circuit view of the pixel portion of the third embodiment of the present invention.

FIG. 15 is an equivalent circuit of a pixel portion having the electrode structure shown in FIG. 12.

When the shape of the pixel electrode or common line is changed as described above, there is also obtained an effect that when an image is displayed by driving the liquid crystal display device, it is possible to prevent light leakage that light is transmitted through a gap between wiring lines.

An orientation film made of polyimide is formed on the thus formed CMOS structure. The orientation film is formed by a well-known spin coat method or a DIP method of polyimide.

Next, the surface of the orientation film is subjected to rubbing.

The direction of rubbing is different among liquid crystal materials used. In the case where a material has a positive dielectric constant anisotropy, the rubbing direction is made such that it is not parallel to the direction of an electric field but is slanted with respect to the electric field direction at an angle of 45° or less. In the case where a material has a negative dielectric constant anisotropy, the rubbing direction is made such that it is not perpendicular to the electric field but is slanted with respect to the direction perpendicular to the electric field at an angle of 45° or less. The rubbing process of the second substrate side is carried out in parallel or antiparallel to the rubbing direction of the first substrate.

A liquid crystal panel is formed by laying the thus formed substrate and opposite substrate one on top of another. The pair of substrates are made to have a uniform substrate interval over the entire of a panel surface by placing a spherical spacer between the substrates. Also, further, the pair of substrates are sealed with an epoxy-based adhesive so that they are adhesively fixed to each other. The sealing pattern is such that the pixel region and peripheral drive circuit region are surrounded. Thereafter, after the pair of substrates are cut into a predetermined shape, a liquid crystal material is injected.

Next, two polarizing plates are bonded to the outside of the substrate. The polarizing plates are arranged so that optical axes of the polarizing plates are orthogonal to each other, and an optical axis of one of the polarizing plates is made parallel to the rubbing direction.

When the substrates are laminated in this way, it is generally disposed a black matrix (BM) having shading properties over the gaps between wiring lines and transistors through which visible light is not needed to be transmitted when an image is displayed by driving the liquid crystal display device.

The black matrix may be made of a metallic thin film having light shading properties, such as a titanium film or a chromium film, or a film of resin material dispersed with a black pigment.

Conventionally, when the black matrix (BM) is formed, the black matrix is formed with a large positioning margin, so that an opening rate of the pixel region is lowered.

However, in the present invention, as shown in FIG. 12, the shape of the pixel electrode and common line is changed to make the BM so that the black matrix is not formed in the pixel display region, if possible, whereby the opening rate is improved.

With respect to a semiconductor layer region which can not be shaded by merely changing the shape of the wiring lines, the semiconductor layer region is formed of a material having shading properties and functioning as the BM, or the BM is formed on the opposite substrate for only this portion. This black matrix may be smaller than the common electrode, and is not formed in the pixel display region.

Since the region which can not be shaded, is surrounded by wiring lines, even if the black matrix is formed, the opening rate is not truly lowered.

In this way, a large positioning margin becomes unnecessary, the opening rate is improved, and at the same time, the semiconductor region is protected against light deterioration.

In this way, through the five mask steps, it is possible to obtain a liquid crystal display device capable of modulating light by controlling liquid crystal orientation without providing a transparent electrode.

Also, by adopting the structure of an IPS mode, a gap in alignment between upper and lower substrates is eliminated, the accuracy of distance between the common electrode and liquid crystal driving electrode can be improved, and the opening rate is improved.

In the following, the present invention will be described in more detail with reference to specific embodiments.

[Embodiment 1]

Manufacturing steps of a liquid crystal display device according to this embodiment at a temperature of not higher than 600° C. will be described with reference to FIGS. 4 to 8.

A silicon oxide film with a thickness of 2,000 Å is grown as an under layer (not shown) on a substrate 201 (#1737 made by Corning) having an insulating surface by the sputtering method. In the case where a quartz substrate or the like is used, the under layer may not be grown.

Thereafter, an amorphous silicon film 101 with a thickness of 300 to 1,000 Å, in this embodiment, with a thickness of 500 Å is grown on the under layer of the silicon oxide by a parallel flat plate type plasma CVD method using glow discharge of silane. In the case where a low pressure CVD method is used, disilane is used to form an amorphous silicon film at a temperature of 450 to 650° C., typically 540° C. (FIG. 4A).

After the amorphous silicon film is formed, the amorphous silicon film is made to have crystallinity by a method of laser beam irradiation, heat treatment, or a combination of the laser beam irradiation and heat treatment.

The thus obtained crystalline silicon film is patterned (1) by photolithography so that an island region is formed (FIG. 4B).

Further, a silicon oxide film, silicon nitride film, silicon nitride oxide film, or laminated film thereof with a thickness of 500 to 2,000 Å, in this embodiment, a silicon oxide film with a thickness of 1,000 Å is deposited, as a gate insulating film 205, on the entire surface of the crystalline silicon film by the plasma CVD method. In the plasma CVD method, a mixed gas of silane and oxygen is glow discharged to form a film (FIG. 4C).

FIG. 5 is a top view showing this state.

In this embodiment, as shown in FIG. 5, the shape of the semiconductor layer is bent-shaped.

Thereafter, an aluminum film with a thickness of 3,000 to 10,000 Å, in this embodiment, with a thickness of 4,000 Å is formed, as a first conductive film 210, on the entire surface of the gate insulating film by the sputtering method (FIG. 6A).

An aluminum alloy target containing silicon, scandium or the like of 0.1 to 5 wt % is used for the growth of aluminum film. In this embodiment, the film growth is carried out by using a target containing scandium of 0.2 wt %.

Scandium is contained so as to suppress the formation of protrusions called hillocks or whiskers due to abnormal growth of aluminum in a subsequent heat process exceeding 100° C.

Conductive metal such as Cr, Ta and Ti may be used other than aluminum.

Next, by using a resist mask formed on the first conductive film, the aluminum film and the gate insulating film are patterned (2) and the resist mask is removed, so that the conductive film is shaped into a gate line 102 at a region covering the channel region. At the same time, a common line is formed (FIG. 6B).

FIG. 7 is a top view showing this state.

The gate insulating film 205 is removed with the gate line 102 as a mask.

Thereafter, the entire surface is doped with P (phosphorus) ions as an impurity imparting N type by a well-known ion doping method.

Next, a resist mask covering an N-channel thin film transistor is arranged (3).

Thereafter, B (boron) ions are implanted.

A region before implantation of B ions is a low concentration impurity region in which P ions of low concentration are implanted. Thus, the conductivity thereof is easily inverted by the implantation of B ions.

Then the resist mask is removed and laser beam irradiation is carried out to activate the implanted impurity and to anneal the region where the impurity ions are injected. Next, as a first interlayer insulating film, a silicon nitride film 206 with a thickness of 3,000 to 8,000 Å, in this embodiment, with a thickness of 5,000 Å is formed by the plasma CVD method (FIG. 8G). This film may be an silicon oxide film, or a multilayer film of silicon oxide film and silicon nitride film. Also, the film may be a film using an organic material made of polyimide or the like.

In the case where polyimide is used, the interlayer film is made a flattened film by a well-known spin coating method.

By flattening the film in this way, second metal wiring lines formed in a subsequent step can be positioned at substantially the same distance with respect to the substrate.

Further, the film may be a multilayer film formed by, for example, after formation of a silicon nitride film with a thickness of 2,500 Å, forming a flattened polyimide film with a thickness of 2,500 Å.

Thereafter, a resist mask is formed on the interlayer insulating film.

Then etching is carried out (4) so that a contact hole for a source region 202 and a contact hole for a drain region 203 are formed (FIG. 8H).

Then an aluminum film with a thickness of 3,000 to 10,000 Å, in this embodiment, with a thickness of 4,000 Å is deposited, as a second conductive film, on the entire surface by the sputtering method.

This aluminum film is formed by using a target containing scandium of 0.2 wt % like the first conductive film. Other than aluminum, conductive metal such as Cr, Ta and Ti may be used.

Next, by using a resist mask formed on the conductive film, the aluminum film is patterned (5) and the resist mask is removed, so that a pixel electrode 108, a common electrode, and a source line 106 are formed (FIG. 8I).

FIG. 1 is a top view showing this state.

At this time, the distance between the substrate and the end of the pixel electrode is substantially equal to the distance between the substrate and the end of the common electrode.

Thereafter, as a second interlayer film, a flattened film made of polyimide or the like may be formed. This flattened film serves also as a protective film.

Next, an orientation film made of polyimide is formed. The orientation film is formed by a well-known spin coating method or a DIP method of polyimide.

Next, the surface of the orientation film is subjected to rubbing.

The rubbing direction is different among liquid crystal materials used. In the case where a material has a positive dielectric constant anisotropy, the rubbing direction is not parallel to the direction of an electric field but is slanted with respect to the electric field direction at an angle of 45° or less. In the case where a material has a negative dielectric constant anisotropy, the rubbing direction is not perpendicular to the electric field but is slanted with respect to the direction perpendicular to the electric field at an angle of 45° or less.

Next, details of manufacturing steps of an opposite substrate will be described.

First, a black matrix with a thickness of 1,000 to 2,000 Å is formed on the opposite substrate.

This black matrix is disposed at only gaps in metal wiring lines other than pixel display portions when a liquid crystal cell is assembled later. As the black matrix, a metal thin film or a thin film of resin material containing a black pigment is used.

Next, in the case where a color image is needed to be displayed, a color filter is formed by a well-known method.

Next, a flattened film made of transparent resin material is formed to cover the black matrix and the color filter.

The rubbing direction of the opposite substrate is made parallel or antiparallel to the rubbing direction of the first substrate.

The thus formed substrate and opposite substrate are laminated so that a liquid crystal panel is formed. A spherical spacer is put between the pair of substrates so that the distance between substrates is uniform over the entire surface of the panel. The pair of substrates are sealed with an epoxy-based adhesive so that the substrates are adhesively fixed to each other. The pattern of seal surround the pixel region and peripheral drive circuit region. After the pair of substrates are cut into a predetermined shape, a liquid crystal material is injected between the substrates.

Finally, two polarizing plates are bonded to the outside of the substrate so that the liquid crystal display device is completed.

[Embodiment 2]

In the structure of this embodiment, an electrode pattern is different from embodiment 1.

First, an under layer (not shown) and an amorphous silicon film are formed on a substrate having a insulating surface in the same manner as the embodiment 1.

After the amorphous silicon film is formed, like the embodiment 1, the amorphous silicon film is made to have crystallinity.

The thus obtained crystalline silicon film is shaped into an island region by the similar method as the embodiment 1. The shape of this crystalline silicon film is as shown in FIG. 11.

Further, a gate insulating film is deposited on the entire surface of the crystalline silicon film by the similar method to the embodiment 1.

Thereafter, an aluminum film as a first conductive film is deposited on the entire surface of the gate insulating film by the similar method to the embodiment 1.

Next, by using a resist mask formed on the first conductive film, the aluminum film and the gate insulating film are patterned, and the resist mask is removed, so that the conductive film is shaped into a gate line at a region covering a channel region. At the same time, a common line and a source line with a width of 6 μm are formed.

Then the gate insulating film is removed.

Thereafter, by the similar method to the embodiment 1, the entire surface is doped with P (phosphorus) ions as an N-type imparting impurity by a well-known ion doping method.

Next, a resist mask covering an N-channel thin film transistor is arranged.

Thereafter, by the similar method to the embodiment 1, B (boron) ions are implanted. Then, laser annealing is carried out.

Next, by the similar method to the embodiment 1, an interlayer insulating film is formed. A flattened film may be laminated on the interlayer film by a well-known spin coating method.

Thereafter, a resist mask is formed on a polyimide film. Then etching is carried out to form a contact hole for a source region and a contact hole for a drain region.

By the similar method to the embodiment 1, an aluminum film as a second conductive film is deposited on the entire surface.

Next, by using a resist mask formed on the conductive film, the aluminum film is patterned, and the resist mask is removed, so that pixel electrodes and common electrodes are formed.

In this embodiment, in one pixel, three common electrodes 1110, 1111 and 1112 are formed, and pixel electrodes 1108 and 1109 with a width of 2 μm are formed between the adjacent common electrodes.

FIG. 11 shows the thus formed pixel portion.

By the similar method to the embodiment 1, a liquid crystal cell is fabricated. Thereafter, similar to the embodiment 1, polarizing plates are bonded to the pair of substrates, so that a liquid crystal electro-optical device is formed.

[Embodiment 3]

The structure of this embodiment, as shown in FIGS. 12 and 13, is different from the embodiment 1 in a pixel electrode pattern, a common electrode pattern and an opposite substrate having a black matrix.

First, on a substrate having an insulating surface, an under film (not shown) and an amorphous silicon film are formed by the similar method to the embodiment 1.

After forming the amorphous silicon film, similar to the embodiment 1, the amorphous silicon film is made to have crystallinity.

The thus obtained crystalline silicon film is shaped into an island region 1201 by the similar method to the embodiment 1.

Further, a gate insulating film 1305 is deposited on the entire surface of the crystalline silicon film 1201 by the similar method to the embodiment 1.

Thereafter, an aluminum film as a first conductive film is deposited on the entire surface of the gate insulating film by the similar method to the embodiment 1.

Next, by using a resist mask formed on the first conductive film, the aluminum film and the gate insulating film are patterned, and the resist mask is removed, so that the conductive film is shaped into gate lines 1202 and 1205 at regions covering a channel region. At the same time, common lines 1203 and 1204 are formed.

FIG. 14 is a top view showing this state.

As shown in FIG. 14, the shape of the common line 1203 is changed so that the common line serves also as a BM.

Then the gate insulating film is removed.

Thereafter, by the similar method to the embodiment 1, the entire surface is doped with P (phosphorus) ions as an N-type imparting impurity by a well-known ion doping.

Next, a resist mask covering an N-channel thin film transistor is disposed.

Thereafter, by the similar method to the embodiment 1, B (boron) ions are implanted. Then, laser annealing is carried out.

Next, by the similar method to the embodiment 1, an interlayer insulating film is formed. A flattened film by a well-known spin coating method may be laminated on the interlayer film.

Thereafter, a resist mask is formed on a polyimide film.

Then, etching is carried out to form a contact hole for a source region 1302 and a contact hole for a drain region 1303.

Then, by the similar method to the embodiment 1, an aluminum film as a second conductive film is deposited on the entire surface.

Next, by using a resist mask formed on the conductive film, the aluminum film is patterned and the resist mask is removed, so that a pixel electrode 1208, common electrodes 1210 and 1211, and source lines 1206 and 1207 are formed.

Figure 13A:
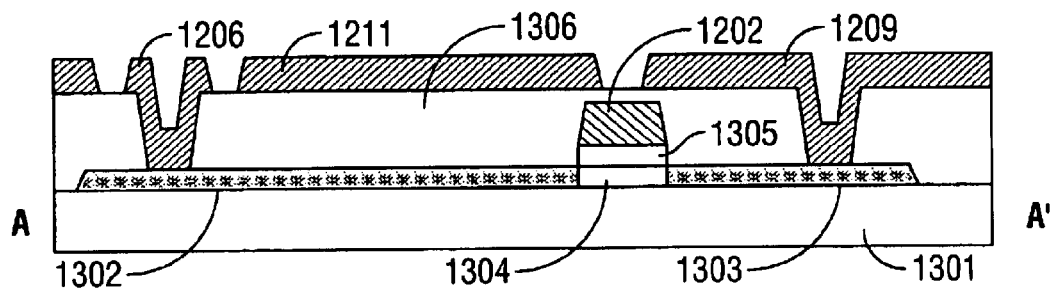
FIGS. 13A to 13C are is sectional views showing the structure of the pixel portion of the third embodiment of the present invention taken along line A–A', B–B', and C–C' of FIG. 12.
Figure 13B:
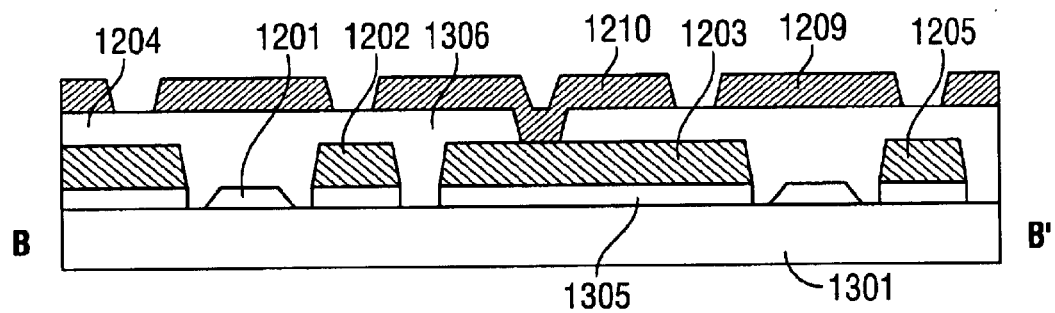
Figure 13C:
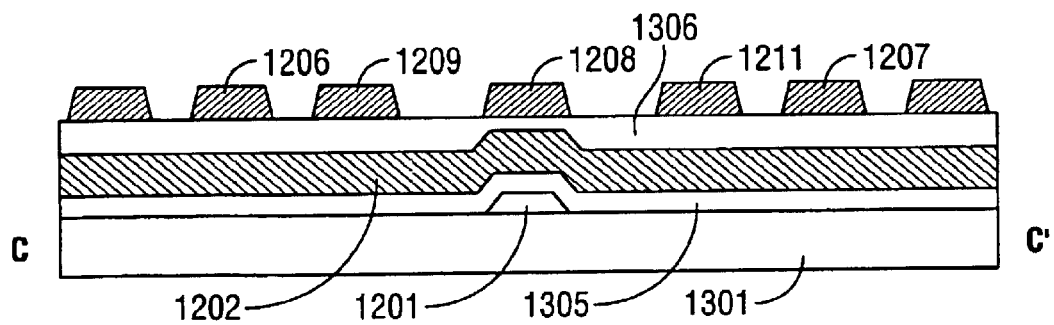

FIG. 12 is a top view showing this state, and FIGS. 13A to 13C are sectional views showing this state.

The pattern of the pixel electrode at this time is, as shown in FIG. 12, T-shaped, and overlaps with both the common line and the gate line. Holding capacitance is formed at the overlapping portions.

FIG. 15 is an equivalent circuit view of a pixel portion of this embodiment.

Next, details of manufacturing steps of an opposite substrate of this embodiment will be described.

First, a black matrix with a thickness of 1,000 to 2,000 Å is formed on the opposite substrate. Materials used in the black matrix is metal thin film or resin material containing a black pigment.

Figure 16:
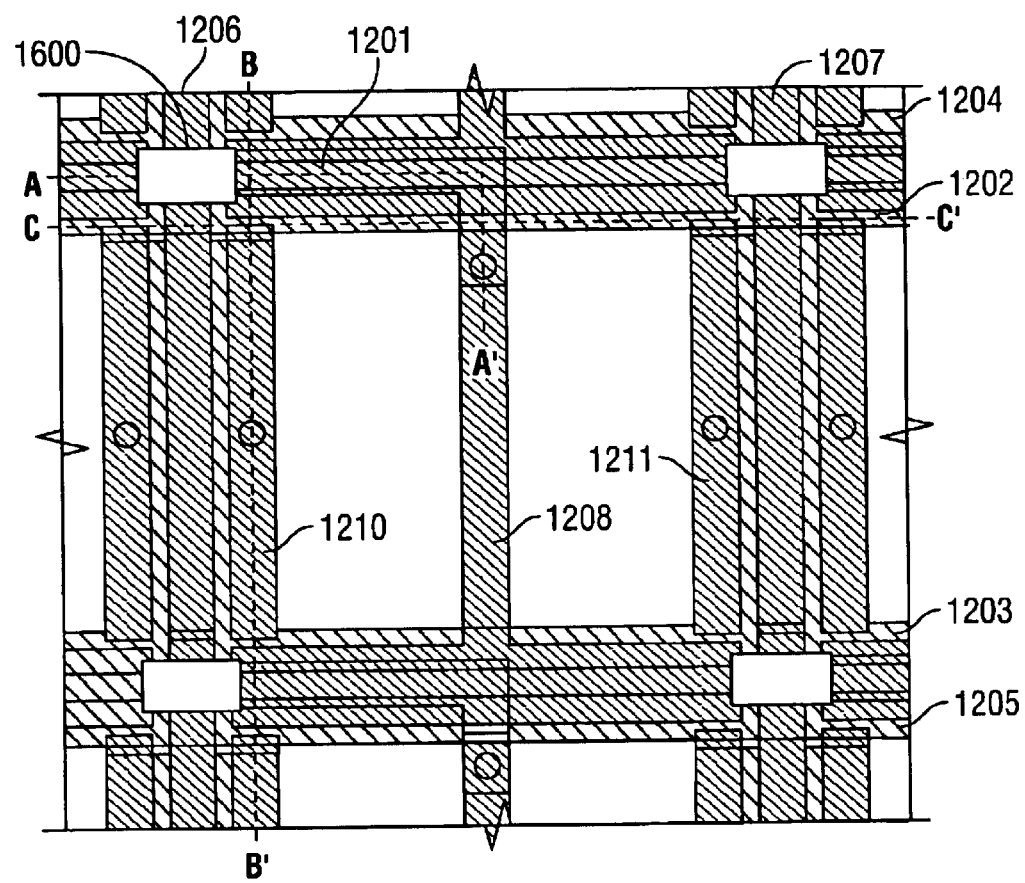
FIG. 16 is a top view when substrates opposite to each other are bonded in the third embodiment 3 of the present invention.

As in this embodiment, only the semiconductor layer region which can not be shaded even if the shape of the wiring lines are changed, is shaded by the BM of the opposite substrate (FIG. 16).

Thus, this black matrix 1600 may be smaller than the common electrode 1208, and is not formed in the pixel display region.

Even if this small black matrix is formed, an opening rate is not truly lowered.

Also, the semiconductor layer region which can not be shaded by merely changing the shape of the wiring lines, may be formed of a material functioning as a BM.

By this, a large positioning margin is not needed, an opening rate is improved, and at the same time, the semiconductor region is protected against light deterioration.

Subsequently, by the similar method to the embodiment 1, a liquid crystal cell is formed. Thereafter, similar to the embodiment 1, polarizing plates are bonded to the pair of substrates, so that a liquid crystal electro-optical device is formed.

[Embodiment 4]

Figure 3A:
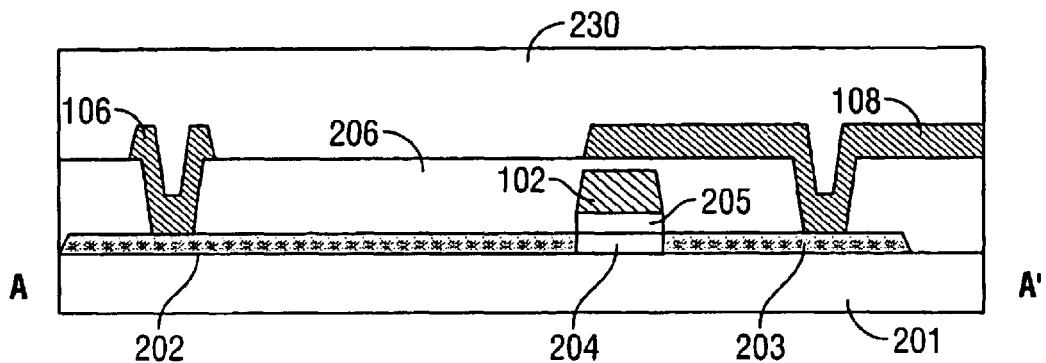
FIGS. 3A to 3C are sectional views showing the pixel portion of a fourth embodiment of the present invention taken along line A–A', line B–B' and C–C' in FIG. 1.
Figure 3B:
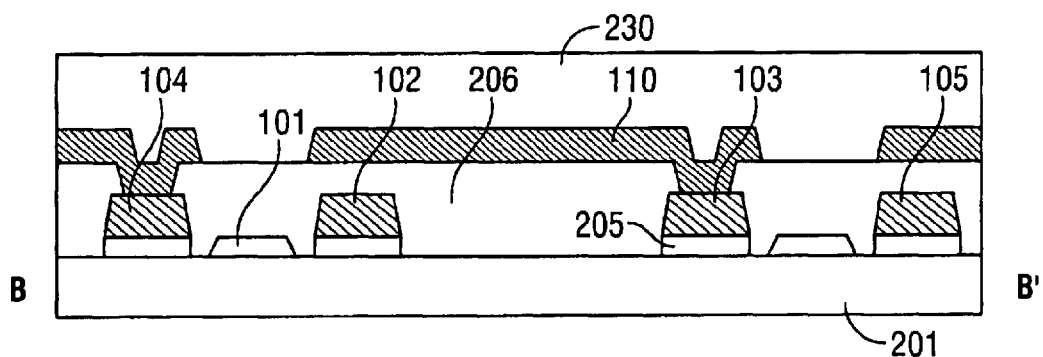
Figure 3C:
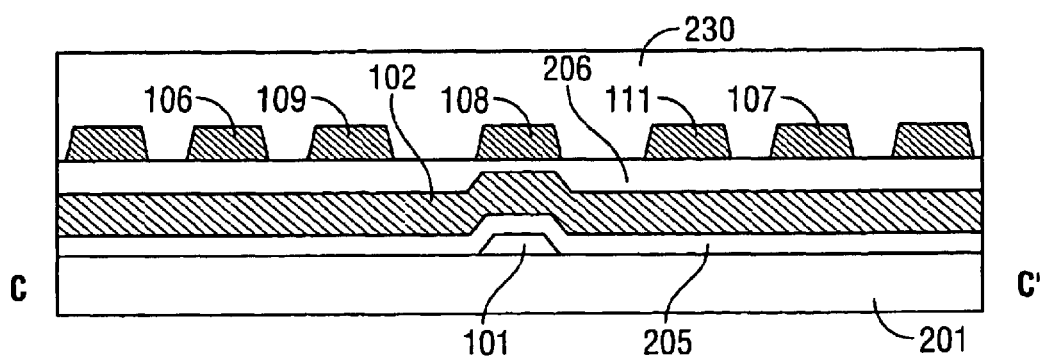

The structure of this embodiment, as shown in FIG. 3, is different from the embodiment 1 in that after a pixel electrode and a common electrode are formed, a second interlayer insulating film is formed.

Thus, a top view of this embodiment is the same as FIG. 1.

The manufacturing steps of this embodiment are the same as the embodiment 1 till the step of forming a pixel electrode 108, common electrodes 110 and 111, and source lines 106 and 107.

After forming the pixel electrode, common electrodes, and source lines, a silicon nitride film 230 with a thickness of 3,000 to 8,000 Å, in this embodiment, with a thickness of 5,000 Å is formed as a second interlayer insulating film by the plasma CVD method.

This film may be a silicon oxide film, or a multilayer film of a silicon oxide film and a silicon nitride film. Also, this film may be an organic film made of polyimide or the like.

In the case where the polyimide film is used, the interlayer film can be flattened by a well-known spin coating method. By flattening in this way, each of second metal wiring lines formed in a subsequent step can be further located substantially at the same position with respect to the substrate.

Also, the second interlayer insulating film may be a multilayer film formed in such a manner that after a silicon nitride film with a thickness of 2,500 Å is formed, a flattened polyimide film with a thickness of 2,500 Å is formed.

This second interlayer insulating film serves to protect a TFT. Further, by changing the thickness of this film, the intensity of an electric filed applied to the liquid crystal layer can be adjusted.

Subsequently, by the similar method to the embodiment 1, a liquid crystal cell is formed. Thereafter, similar to the embodiment 1, polarizing plates are bonded on the pair of substrates to form a liquid crystal electro-optical device.

[Embodiment 5]

In the structure of this embodiment, at the same time as the manufacturing steps of the embodiment 1, a wiring connection terminal 900 for an external device shown in FIG. 9A is fabricated through the five masks in steps (1), (2), (3), (4) and (5). FIG. 9B is a sectional view showing this wiring connection terminal.

First, similar to the embodiment 1, an amorphous silicon film is formed on a substrate having an insulating surface, and is patterned (1) into an island having a desired size and a shape of the wiring connection terminal by using photolithography.

However, since this step is merely for adjusting the height, it may be omitted in the formation of the wiring connection terminal.

Next, similar to the embodiment 1, a gate insulating film 205 is formed thereon.

A first conductive film 210 is formed on the gate insulating film similar to the embodiment 1. Cr, Al, Ta or Ti may be used as the material of this first conductive film. Also, a multilayer film of a laminated layer thereof may be formed.

Next, similar to the embodiment 1, patterning is carried out (2) by using photolithography to form a first wiring terminal 211.

Then, similar to the embodiment 1, the gate insulating film 205 is etched and a first interlayer insulating film 206 is formed.

Thereafter, similar to the embodiment 1, patterning is carried out (4) by using the photolithography, and the first interlayer insulating film on the first wiring terminal 211 is removed. A second conductive film 220 is formed thereon by a well-known sputtering method.

Then, by using the photolithography again, patterning is carried out (5) so that a second wiring terminal 221 is formed.

Thereafter, in the case where a second interlayer insulating film 230 is formed as in the embodiment 4, the surface of the second wiring terminal 221 is covered (FIG. 10A).

Then $O_2$-ashing is carried out to shave off the surface to expose the surfaces of the second wiring terminal and second wiring line (FIG. 10B). In this way, the wiring connection terminal 900 for an external device can also be formed by four or five masks in steps of (1), (2), (3), (4) and (5).

By the above manufacturing steps, a liquid crystal display device of peripheral drive circuit integration type provided with wiring connection terminal for an external device is formed through five or less masks.

[Embodiment 6]

The structure of this embodiment is the same as the embodiment 1 except the following.

First, a quartz substrate is used as an insulating substrate. Incidentally, the substrate is not limited to quartz as long as it can withstand temperatures of a heat treatment.

A silicon oxide film with a thickness of 3,000 Å is grown as an under layer on the quartz substrate.

Next, an amorphous silicon film with a thickness of 600 Å is grown by a low pressure CVD method.

The thickness of this amorphous silicon film is preferably not larger than 2,000 Å.

Thereafter, a metal element for facilitating crystallization is selectively introduced into a part of the amorphous silicon film, and heat treatment at 640° C. for 4 hours is carried out to crystallize.

After a crystalline silicon film is obtained, a heat treatment at 950° C. is carried out in an oxygen atmosphere containing HCl of 3%, so that a thermal oxidation film with a thickness of 200 Å is grown.

Next, the thermal oxidation film is removed. Then patterning is carried out (1) to obtain an island region.

Subsequently, by the similar method to the embodiment 1, a liquid crystal cell is fabricated. Thereafter, similar to the embodiment 1, polarizing plates are bonded on the pair of substrates to form a liquid crystal electro-optical device.

In this way, the liquid crystal display device capable of controlling liquid crystal orientation and modulating light can be obtained through five mask steps without providing a transparent electrode.

By adopting the structure of an IPS mode, the gap in alignment between upper and lower substrates is eliminated, so that the accuracy of distance between the common electrode and the liquid crystal drive electrode can be improved.

In the conventional electrode wiring using a comb-shaped electrode, there are many wiring lines and electrodes existing in the layer closest to the liquid crystal layer, and they have complicated shape, so that complicated electric fields are generated in the liquid crystal layer in contact with the pixel display portion, and complicated electric force lines exist. Thus, the opening rate is low, and due to the complicated shape of electrodes, electric fields applied to each of the respective liquid crystals at the pixel display portions become irregular, and display characteristics are deteriorated.

However, as in the present invention, when the common line and common electrode are separated from each other into different layers with an insulating layer, and are made to be brought into contact through a contact hole, wiring lines and electrodes existing in the layer closest to the liquid crystal layer become only the common electrode, pixel electrode and source line.

The common electrode, pixel electrode and source line have a simple shape and are disposed in the same layer in parallel with each other.

Thus, it is possible to apply a more uniform lateral electric field to the liquid crystal material being in contact with the pixel display portion, so that display characteristics are improved.

As described above, in the present invention, the gate line and common line are previously formed, and after the first interlayer film is formed, the pixel electrode and common electrode are formed. By this first interlayer film, the distance between the end of the pixel electrode and the substrate is made to be substantially equal to that between the end of the common electrode and the substrate.

That is, by the interlayer film, the end of the pixel electrode is arranged just beside the end of the common electrode on the interlayer insulating layer.

Further, this first interlayer film has effects that unnecessary wiring lines (common line and source line) when an electric field is applied to the liquid crystal layer, are separated to prevent the disturbance of an electric field, and the pixel electrode and common electrode formed in a subsequent step are located so that the distances between the substrate and both the electrodes are made more approximate to each other.

In the present invention, the first interlayer film may be made a flattened film, and the pixel electrode, common electrode, and source line may be formed. This has an effect that the pixel electrode and common electrode formed in a subsequent step can be located so that the distances between the substrate and both the electrodes are made more approximate to each other.

Further, after the common electrode, pixel electrode and source line are formed, a flattened second interlayer film may be formed. This flattened second interlayer film serves also as a protective film.

In the present invention, the common electrode, pixel electrode and source line are arranged in the same layer in parallel with each other, and are made of the same material and by the same steps.

This decreases the number of electrode layers and lowers the cost.

Further, since the electrode wiring lines are made simpler than the conventional comb-shaped electrode, the opening rate is improved.

When aluminum is used as a material of electrodes and wiring lines grown at a temperature not higher than 650° C., the electrodes and wiring lines have high conductivity and superior heat radiation properties, so that they can protect a TFT against generated heat.

Further, since aluminum has low resistance, a loss is low, and the respective wiring lines are prevented from interfering with each other.

Further, conventionally, in order to fabricate a wiring connection terminal, a step of using a mask must be added. However, in the present invention, at the same time as the above manufacturing steps, the wiring connection terminal can be fabricated by the mask steps (1), (2), (3), (4), and (5), so that the liquid crystal display device of peripheral drive circuit integration type provided with a wiring connection terminal for an external device can be manufactured through five or less masks.

Also, in the prior art, there is a problem that when a black matrix is formed by taking a large positioning margin on an opposite substrate, the opening rate is lowered.

However, in the present invention, as shown in FIG. 12, the shape of the pixel electrode and common electrode can be changed to make a BM. The semiconductor region which can not be shaded by only changing the shape of the wiring lines is used as a semi BM, or as shown in FIG. 16, a BM smaller than the common electrode is formed on the opposite substrate only at this portion.

This eliminates the necessity of a large positioning margin, improves the opening rate, and can protect the semiconductor region against deterioration by light.

As described above, the present invention has a high technical value. Especially, when thin film transistors are formed on a large area substrate, and these are used for an active matrix, a driver circuit, a CPU, or a memory to form an onboard ultrathin personal computer or a portable terminal, the field of application of the present invention is enlarged without limit and the invention is qualified to form new industry.

What is claimed is:

1. A display device comprising:
   a pair of substrates, at least one thereof being transparent;
   a liquid crystal layer comprising liquid crystal molecules placed between the pair of substrates;
   a plurality of pixels arranged in a matrix form on one of the pair of substrates; and
   a pixel electrode and a common electrode existing on the same flattened film comprising organic resin disposed on a common line,
   wherein the common electrode and the common line are connected to each other through a contact hole in the flattened film, and
   wherein an electric field is applied between the pixel electrode and the common electrode substantially parallel to surfaces of the pair of substrate, to control orientation state of said liquid crystal molecules so that light is modulated.

2. A device according to claim 1, wherein the display device is active matrix type in which the respective pixels include a thin film transistor, the thin film transistor including a pixel electrode, a gate line connected to a scanning line, and a source line connected to a signal line.

3. A device according to claim 1, wherein the common electrode and the pixel electrode exist in the same layer, are parallel to each other, and are made of the same material and by same steps.

4. A device according to claim 3, wherein the common electrode and the pixel electrode are made of aluminum, metal mainly containing aluminum, silicon, or a laminated layer of titanium and aluminum.

5. A device according to claim 1, wherein the common line and a gate line exist in the same layer, comprise the same material, and are formed by the same steps.

6. A device according to claim 1, wherein the organic resin is polyimide.

7. A liquid crystal device comprising:
   a pair of substrates, at least one thereof being transparent;
   a liquid crystal layer comprising liquid crystal molecules placed between the pair of substrates;
   a plurality of pixels arranged in a matrix form on one of the pair of substrates;
   a pixel electrode and a common electrode existing on the same insulating film disposed on a common line; and
   a flattened film comprising organic resin disposed on the common electrode and the pixel electrode,
   wherein the common electrode and the common line are connected to each other through a contact hole in the insulating film, and
   wherein an electric field is applied between the pixel electrode and the common electrode substantially parallel to surfaces of the pair of substrate, to control orientation state of said liquid crystal molecules so that light is modulated.

8. A device according to claim 7, wherein the organic resin is polyimide.

9. A liquid crystal device comprising:
   a pair of substrates, at least one thereof being transparent;
   a liquid crystal layer comprising liquid crystal molecules placed between the pair of substrates;
   a plurality of pixels arranged in a matrix form on one of the pair of substrates;
   a pixel electrode placed between a pair of common electrodes in one pixel, the pixel electrode and the pair of common electrodes existing on the same insulating film disposed over a common line; and
   a flattened film comprising organic resin disposed on the pixel electrode and the pair of common electrodes,
   wherein an electric field is applied between the pixel electrode and the common electrode substantially parallel to surfaces of the pair of substrate, to control orientation state of said liquid crystal molecules so that light is modulated,
   wherein the pair of common electrodes and the common line are connected to each other through a contact hole in the insulating film.

10. A device according to claim 9, wherein the organic resin is polyimide.

11. A method of manufacturing a display device, comprising the steps of:
   forming a crystalline semiconductor layer on a substrate having an insulating surface;
   forming a gate insulating film on the crystalline semiconductor layer;
   forming a first conductive film on the gate insulating film;
   shaping the first conductive film into a gate line and a common line;
   doping the crystalline semiconductor layer;
   forming a first interlayer film over the gate line and the common line;
   forming three contact holes in the first interlayer film;
   forming a second conductive film on the first interlayer film; and
   shaping the second conductive film into a pixel electrode, a common electrode and a source lines.

12. A method of manufacturing a display device, comprising the steps of:
    forming a crystalline semiconductor layer on a substrate having an insulating surface;
    forming a gate insulating film on the crystalline semiconductor layer;
    forming a first conductive film on the gate insulating film;
    shaping the first conductive film into a gate line and a common line;
    doping the crystalline semiconductor layer;
    forming a first interlayer film over the gate line and the common line;
    forming three contact holes in the first interlayer film;
    forming a second conductive film on the first interlayer film;
    shaping the second conductive film into a pixel electrode, a common electrode and a source line; and
    forming a flattened film on the pixel electrode, the common electrode, the source line, and the entire surface of the substrate.

13. A method according to claim 12, wherein the flattened film comprises an organic film of polyimide.

14. A method of manufacturing a display device, comprising the steps of:
    forming a crystalline semiconductor layer on a substrate having an insulating surface;
    forming a gate insulating film on the crystalline semiconductor layer;
    forming a first conductive film on the gate insulating film;
    shaping the first conductive film into a gate line and a common line;
    doping the crystalline semiconductor layer;
    forming a first interlayer film over the gate line and the common line;
    forming three contact holes in the first interlayer film;
    forming a second conductive film on the first interlayer film; and
    shaping the second conductive film into a pixel electrode, a common electrode and a source line.

15. A method according to claim 14, further comprising the step of forming a flattened film on the entire surface of the substrate after the step of shaping the second conductive film into the pixel electrode, the common electrode and the source line.

16. A device according to claim 14, wherein five masks are used to manufacture the display device.

17. A method of manufacturing a display device, comprising the steps of:
    forming a crystalline semiconductor layer on a substrate having an insulating surface;
    forming a gate insulating film on the crystalline semiconductor layer;
    forming a first conductive film on the gate insulating film;
    shaping the first conductive film into a gate line and a common line;
    oxidizing the gate line and the common line;
    carrying out first impurity doping to the crystalline semiconductor layer;
    removing the oxidized conductive film;
    carrying out second impurity doping to the crystalline semiconductor layer with a concentration lower than the first impurity doping after the step of removing the oxidized conductive film;
    forming a first interlayer film over the gate line and the common line;
    forming three contact holes in the first interlayer film;
    forming a second conductive film on the first interlayer film; and
    shaping the second conductive film into a pixel electrode, a common electrode, and a source line.

18. A method according to claim 17, further comprising the step of forming a flattened film on the entire surface of the substrate after the step of shaping the second conductive film into the pixel electrode, the common electrode and the source line.

19. A device according to claim 17, wherein five masks are used to manufacture the display device.

20. A liquid crystal device comprising:
    a pair of substrates, at least one thereof being transparent;
    a liquid crystal layer comprising liquid crystal molecules placed between the pair of substrates;
    a plurality of pixels arranged in a matrix form on one of the pair of substrates;
    a pixel electrode and a common electrode existing on the same first flattened film comprising organic resin disposed on a common line; and
    a second flattened film comprising organic resin disposed on the common electrode and the pixel electrode,
    wherein the common electrode and the common line are connected to each other through a contact hole in the first flattened film, and
    wherein an electric field is applied between the pixel electrode and the common electrode substantially parallel to surfaces of the pair of substrate, to control orientation state of said liquid crystal molecules so that light is modulated.

21. A device according to claim 20, wherein at least one of the first and second flattened films comprising organic resin is polyimide.

* * * * *